(12) United States Patent
Tsui

(10) Patent No.: US 7,089,190 B2
(45) Date of Patent: Aug. 8, 2006

(54) SYSTEM AND METHOD FOR MANAGING UTILITY POWER USE

(75) Inventor: Jonah Tsui, Bothell, WA (US)

(73) Assignee: Power Resource Managers, LLP, Bellevue, WA (US)

( * ) Notice: Subject to any disclaimer, the term of this patent is extended or adjusted under 35 U.S.C. 154(b) by 546 days.

(21) Appl. No.: 10/152,088

(22) Filed: May 20, 2002

(65) Prior Publication Data

US 2003/0040847 A1    Feb. 27, 2003

Related U.S. Application Data

(60) Provisional application No. 60/291,848, filed on May 18, 2001.

(51) Int. Cl.
*G06F 17/60* (2006.01)

(52) U.S. Cl. .......................... 705/1; 713/320; 713/321

(58) Field of Classification Search .................. 705/1, 705/10; 239/70; 318/6; 370/480; 363/35; 180/65; 361/328; 713/480, 320, 321; 422/112

See application file for complete search history.

(56) References Cited

U.S. PATENT DOCUMENTS

| 3,653,595 | A  | * | 4/1972 | Greengard et al. | ........... 239/70 |
| 6,765,356 | B1 | * | 7/2004 | Denen et al. | .................. 318/6 |
| 2001/0013004 | A1 | * | 8/2001 | Haris et al. | ..................... 705/1 |
| 2004/0131508 | A1 | * | 7/2004 | Fairlie et al. | ............... 422/112 |

FOREIGN PATENT DOCUMENTS

EP           573140 A2 * 12/1993

OTHER PUBLICATIONS

Kwatny, Harry G. & Yu, Xiao-Ming, Energy Analysis of Load-Induced Flutter Instability in Classical Models of Electric Power Networks, 1989, IEEE, 1-14.*

* cited by examiner

*Primary Examiner*—Behrang Badii
(74) *Attorney, Agent, or Firm*—Matthew W. Jellett; Hughes Law Firm, PLLC

(57) ABSTRACT

A system for managing utility power use by ascertaining the amount of resources to be purchased from a power supplier, identifying transactions that balance energy needs with various users, and production of schedules that maximize or minimize potential revenue from surplus energy.

Figure 1:
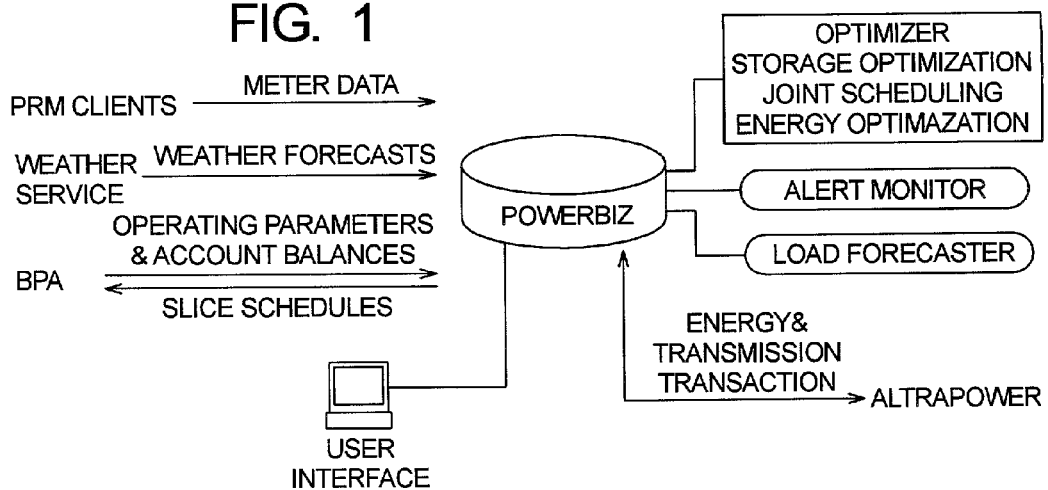

To accomplish this, there are studied forecasted weather, historical weather patterns, industrial and seasonal loads, and other factors affecting timing and use of power.

5 Claims, 5 Drawing Sheets

CONNECTED

DISCONNECTED

SYSTEM AND METHOD FOR MANAGING UTILITY POWER USE

RELATED APPLICATIONS

This application claims priority benefit of U.S. Ser. No. 60/291,848 filed May 18, 2001

BACKGROUND OF THE INVENTION

A) Field of the Invention

The present invention relates to a system and method by which utilities and other power and natural gas companies in the power industry can effectively manage and utilize their power supply as well as position themselves for operation in the changing environment relating to the same.

B) Background Information Relating to the Present Invention

The preferred embodiment of the present invention which is disclosed herein was developed for the particular operating environment which exists in the area served by the Bonneville Power Administration (BPA) and other areas which have somewhat similar operations (e.g. the Western Area Power Administration [WAPA] that operates the Hoover Dam). Further, much of the descriptive text available that describes the system and method of the present invention was prepared with specific reference to the area served by the Bonneville Power Administration. Accordingly, it is believed that a clearer understanding of the present invention will be obtained by relating this preferred embodiment specifically to the operating system in this operating area of the BPA and for convenience of the description, terminology and references will be made to the BPA and the practices in that area.

Also, the assignee of the present invention, which is responsible for the development and implementation of the present invention has adopted terminology describing this system. For example, the overall system is referred to internally by this company by the term "PowerBiz" (the trademark rights of which are being claimed by the Assignee of the present invention) and other terminology adopted by the assignee will appear throughout the text.

However, it is to be understood that this is simply done by way of illustrating this preferred embodiment, and these terms are not being used in a generic sense. Rather, the system and method of the present invention are intended to apply more broadly to other situations in environments where similar or related conditions would be present, and the elements or components having such designations (e.g. "Slice Optimizer") are to be interpreted more broadly.

Also, the following text, the term "BPA" is intended not to refer just to the Bonneville Power Administration, but also to other companies or entities in the power industries which have operations sufficiently related to the concepts of the present invention so that the present invention will be applicable to such entities. Also, the term "Power Companies" is to be used in a broad sense to apply to any of the companies or entities which are engaged in the generation, distribution, use, and/or transportation of power, and more particularly, to those which are dealing in electrical power.

In the distribution of power by the BPA, there is what is called the SLICE System. The SLICE System is the BPA SLICE of the System (SLICE) product. SLICE is predominantly a hydropower generation resource. Like other hydropower resources, it is unique in that use of the resource today influences how much of the resource is available in the future. In other words, once water is released from a reservoir to generate electricity, that water is not immediately replaced. Nature replaces the resource through precipitation and runoff.

The SLICE product is delivered and managed in the form of electrical power. The amount of electrical power a SLICE participant receives is referred to as the SLICE entitlement. This entitlement is not a fixed number but a fixed percentage of the actual output of the Slice System Resources, and therefore is dependent on water conditions that occur in any given year. Also, the amount of SLICE energy delivered to a participant is not guaranteed, nor is the timing of power deliveries likely to match a participant's actual requirements over the course of a year.

The BPA SLICE product has several unique characteristics.

A small portion of SLICE is generated from thermal plants, which covers base load, and is included in the minimum generation limit.

SLICE is also comprised of multiple hydro resources, which means that as water is released from one hydro plant to generate electricity, the released water flows downstream through other hydro plants and generate additional electricity. The result of this downstream effect is addressed in the overall management of SLICE.

In addition, the BPA has ultimate control over SLICE. The participants are not buying any right to operate or control the BPA system resources by purchasing SLICE, and its reservoirs and hydro plants.

Because of this, the BPA will establish and maintain for each participant a SLICE System Storage Account (SSA) in order to determine if each participant is staying within the limits of the SLICE system to store energy and later release stored energy. The SSA is in essence a paper pond. A paper-pond is a contractual storage account, which may or may not correlate to a physical storage account. The SLICE Participant is obligated to maintain its paper pond within its prescribed upper and lower bounds, which change from day-to-day. BPA has the right to levy severe penalties if these bounds are violated.

The participant may shape its SLICE delivery so long as the rate of delivery of SLICE is between the maximum and minimum operating limits established by BPA. BPA will calculate these limits and provide them to the participant for each day. The participant's SLICE SSA will be used to track the accumulate difference between the SLICE power received and the participant's SLICE entitlement.

The advantage of SLICE to the participant is that they can control how this resource in use. A SLICE participant can decide to minimize the amount of SLICE energy delivered to increase the amount of storage in its paper-pond, and conversely they can maximize the amount of SLICE energy and draw down their paper-pond. This flexibility allows a customer to use the SLICE product to counter market price changes. For example, if the market price is high, a SLICE customer can use SLICE energy in lieu of purchasing energy on the open market or they can generate excess energy and sell it. Likewise, if the market price of energy is low, a SLICE customer can reduce the use of SLICE energy and store the energy in the paper-pond.

The advantage to BPA is that they are relieved from the responsibility of meeting the customer's load. The customer has a greater degree of control of the power supply and the obligation to meet load. When the optimal use of SLICE results in deficits or surpluses, the SLICE participant must buy from or sell energy in the open market.

As will be discussed in more detail later herein, the system and method of the present invention determines how to best utilize the SLICE resource for an individual client and for a group of clients. The system is referred to as PowerBiz, and the company or other entity operating the system will be called the PowerBiz provider. The key component of PowerBiz is the Slice Optimizer, which creates an optimal Slice schedule.

As indicated previously, certain terminology used in this text is derived from terms that have been adopted by the Assignee of the present invention. Thus, as indicated above, the term "PowerBiz" refers to the entire system. The term "Slice Optimizer" relates to the computer system and associated components and/or methods in operating the same.

The system can be divided in to two primary functions.

Pre-Schedule Optimization

Real-Time Schedule Optimization

The purpose of pre-scheduling is to identify the firm power needed to meet the forecasted load, as well as any surplus power available for disposal in the open market, and to ensure sufficient transmission exists to move that power. The forecasted load is prepared, based on a correlation of historical weather and energy use patterns. Adjustments for industrial and agricultural loads are also included in the forecasted load. Pre-scheduling is completed the day before the schedule goes into effect.

The purpose of real-time scheduling is to adjust resources to account for changes between the forecasted load and the actual load. Real-time schedule optimization provides information on how to adjust the use of SLICE resources when updated load forecasts based on actual take, and market prices change during the day.

Slice, for all practical purposes, is a hydropower energy resource, and as such, how it is used today effects how it can be used tomorrow. For example, using the Slice resource today to meet a load may mean the Slice resource is not available tomorrow to meet a load. Conversely, if you use less today, there will be more available tomorrow. Because of this, a lot of care must go in to determining how best to use the Slice resource. PRM's Slice Optimizer is designed to provide PRM's schedulers with the information necessary to schedule the Slice resource to achieve optimal economic results and meet the energy demand loads for a utility.

POWERBIZ (i.e. THE SYSTEM OF THE PRESENT INVENTION)

Referring to FIG. 1, the Optimizer is one component of the PowerBiz application. Though the PowerBiz application has many functions, the primary purpose of PowerBiz is to support the optimization of the Slice resources.

For pre-scheduling activities, PowerBiz collects client meter data and weather forecasts, which are used by the Load Forecaster to generate day-ahead load forecasts. The optimizer determines the best schedule for balancing the load forecast with BPA, Slice and other resources. Energy and transmission deals are made and these transactions are recorded in AltraPower. Once the transactions are finalized and recorded, PowerBiz sends a schedule for the Slice resources to BPA.

During real-time operations, if the actual loads differ from the scheduled resources, alerts are triggered prompting the Scheduler to make real-time changes.

SLICE OPTIMIZER

PowerBiz is designed to provide a plan on how to use the SLICE resource to achieve optimal economic results and, in the same time to meet a specific client's loads. Generally, SLICE is only one of many resources that make up the resource portfolio for the participant. Some of the resources may be available in fixed blocks or vary each hour over a period of time. The BPA, other generators, and the market may provide these resources.

Most resources have a unit price associated with it. The SLICE resource is unique in that it has total price, but the unit price is influenced by how much of the SLICE resource is available and is used. How much gets used is dependent upon the client, but how much is available is dependent upon how and when it is replenished by precipitation and runoff.

The optimizer itself performs three separate operations to generate an optimized schedule:

Storage Optimization—Determines the amount of Slice resources to use in order to achieve a targeted storage volume (storage target) or maintain the current reserve (flow target).

Joint Scheduling Optimization—Identifies transactions that balance energy needs across clients of the PowerBiz provider. This allows a client with an energy need to get that energy from another PRM client; provided they return the energy. The energy must be returned once the borrowing entity has surplus energy available during pre-scheduling.

Energy Optimization—If a client of the PowerBiz provider has surplus energy to sell, the optimization produces a schedule that maximizes or minimizes the potential revenue from the surplus energy. Maximizing the potential revenue results in an associated increase in real-time scheduling (increased risk).

The Slice Optimizer needs the following information to run (these are described in further detail below):

Day-Ahead Forecasts—The hourly forecasted load for each client including all transaction to provide power or transmission to other entities.

Slice System Operating Constraints—Operating parameters come from the BPA. These include SLICE percentage; daily max/min generation limits; daily HLH maximum limits; daily LLH minimum limits; hourly max/min limits; stream inflow estimates; max/min ramp rates; and current paper-pond balance. [HLH=heavy load hours (7:00 am to 10:00 pm); LLH=light load hours (10:00 am to 7:00am)]

Power & Transmission Transactions—All transactions related to the purchase of power or transmission.

Operating Strategy—A series of variables that are influenced by the market price of power, expected precipitation and runoff, and long-term market projections. These target level indicate whether to store or use the SLICE resource. The Scheduler can manipulate these operating parameters, which effect how much of the Slice resource is used and the shape of the energy curve in excess or deficit of the forecasted load. The Operating Strategy defines target values for these parameters.

The Optimizer takes this information, and calculates an optimal schedule. The schedulers can generate multiple scenarios to evaluate how they can achieve short or long-term targets. The optimizer also helps maintain operations within predefined operating limits so there are no operating penalties for exceeding minimum or maximum operating limits imposed by the BPA. Such unauthorized increases can result in significant penalties of fines from BPA.

The schedule is compared to the existing transactions. If there is a match between the optimized schedule and existing transactions, the optimizer is complete. The output of the optimizer is used to complete the scheduling of Slice with BPA.

If the optimized schedule and the existing transactions do not match, PRM either buys or sells power and transmission, and the optimizer is re-run. The cycle continues until the transactions match the optimized schedule. Once the balance is achieved, the output of the optimizer is used to complete the scheduling of Slice with BPA.

The Optimizer will generate individual schedules with the BPA for each client. It will also pool the surplus Slice resources in to one block. By doing so, PRM will be able to sell larger, single blocks on the market for its clients. PRM will manage the equitable distribution of such transaction to ensure its clients are credited for their contribution.

SLICE OPTIMIZER INPUTS

Day-Ahead Load Forecast

Various tools can be used to assist in managing power resources. For example, a weather-based forecasting program could be implemented to correlate weather elements to a utility's load.

The load forecast is a prediction of a utility's energy demand, based on a correlation of forecasted weather to historical weather patterns and days with similar daylight hours in the same season of the year. In addition, industrial and seasonal irrigation loads are included in the forecast. The Day-Ahead Load Forecast identifies the load the scheduler must assign resources to meet.

Slice System Operating Constraints

Each Slice participant is entitled to a portion of the Slice system, measured as a percentage of the system this percentage is known as the Slice allowance. BPA provides system-wide and participant specific operating parameters and account information. A participant's portion of the system-wide parameters is determined by applying their Slice allowance to the system constraint. Most operating and account information is provided on a daily basis, but may be changed at any time by BPA.

The following is a description of the operating parameters:

Monthly Forecast—A 60-year projection is provided by September 1 of each year, each month a forward-looking 3-month projection is provided. Analysts will create detailed long-term and short-term operating plans based on these forecasts.

Daily Forecast—A running seven-day forecast of system constraints, which are factored into the short-term operating plans.

Hourly Forecast—BPA will provide system outage information, which is factored into the short-term operating plans.

System Resources—Daily and hourly system-wide limits, including minimum and maximum values for generation, ramp rates, and other physical system operating constraints. They are used directly in the optimizer.

System Record—A running account balance of the Slice resource allocated to each participant. It represents the amount of energy stored by a Slice participant.

The account information tracks the credits and deficits made to the Slice participant's energy account. If a participant takes less than its share of the Slice resources, its account is credited for the difference. Likewise if the participant takes more than its allocation, its account is debited.

Some of these parameters are provided as preliminary estimates, and updated to final as they are certified as complete and accurate by BPA. The PowerBiz application manages this by posting alerts to the Scheduler when updated, revised or finalized values are submitted by BPA.

Power & Transmission Transactions

Power and transmission transaction are logged into a computer system identified as Altra Power. An export routine runs nightly to pull data into PowerBiz. Transactions will be updated in PowerBiz if the transaction already exists, and will be inserted if the transaction does not exist. In addition, whenever a transaction is committed in AltraPower that effects the current day or the next day, the transactions will be exported and made available to PowerBiz. This guarantees that all data from Altra Power is available for pre- and real-time scheduling.

OPERATING STRATEGY

The operating strategy is a document, which defines how Slice participants should position themselves in light of current market, weather and demand trends. This translates into a series of parameters, which are inputs to the optimizer.

Storage Optimization—Storage optimization relies on three variables.

Target Storage Level

Target Storage Level is a percent from 0% to 100%, related to the lower and upper federal storage bounds. The target comes from the short-term operating plan prepared weekly for each client. Calculation of the target storage target level is performed independent of the optimizer, and takes into account factors such as weather, snow pack and runoff forecasts, market projections, long-term energy demand projections, and the level of financial risk acceptable to a client. The optimizer will provide interactive feedback, allowing the operator to adjust storage target level to see how it affects the surplus.

Operation Mode

Two modes of operation are provided: Storage Target and Flow Target. Storage target optimization manages resources with the end objective of having a specific SLICE reserve at the end of the daily cycle. The amount of reserve is the SLICE Storage Ending Target. Flow Target optimization uses the daily river flow and no SLICE reserve.

Energy Account

The balance of all credits and deficits from a participant's Slice allocation. This account identifies if a participant has used more than or less than the entitlement of the Slice resources.

Energy Optimizer—Energy optimization requires the scheduler to specify the Incremental Amount of Real-Time or Hourly sales. This is a factor that runs from conservative to aggressive. Conservative settings reduce the amount of real time scheduling of resources; aggressive settings increase the amount of real-time scheduling. The tradeoff is that the aggressive settings move more SLICE energy into the HLH block, which translates into a great financial opportunity. The downsides to aggressive settings are that unused LLH SLICE resources may be wasted. In addition, the downside to more real-time scheduling relate to the inherent market and price volatility of the real-time market.

This part of the optimizer manages the shaping of the energy curve, it can be used to match the forecasted load curve, or it can maximize the sale of HLH energy (Heavy Load Hour). HLH energy can be sold at a higher unit price then LLH energy (Light Load Hour). Maximizing the sale of HLH energy will increase the workload for the Real-Time Scheduler, as the optimizer will schedule more energy in the HLH period than is required. The Real-time Scheduler will be responsible for selling the excess energy.

Joint Scheduling Optimization—Joint schedule optimization allows pooling of PRM surplus and deficit resources, and balance its needs across its clients. The Joint Scheduling Agreement stipulates that if a participant receives energy from another participant, the borrowing participant must return the energy as soon as it has surplus Slice energy available. There is not financial transaction involved in the transfer, provided the borrower returns the energy to the lender.

The PowerBiz system maintains a record of all credits and deficits from a participant's Joint Scheduling Account. If a participant has borrowed energy from another client, they must return the energy before they can sell any surplus energy on the open market.

SYSTEM ARCHITECTURE—POWERBIZ

Figure 2:
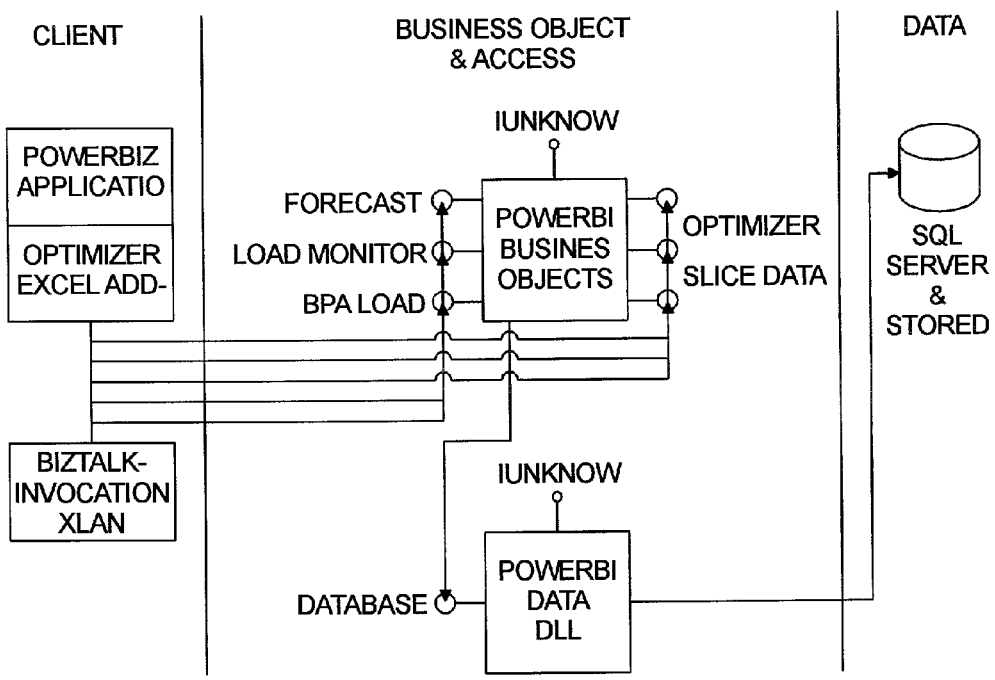

The PowerBiz application is based on a multi-tier architecture. Referring to FIG. 2, the PowerBiz Business Objects DLL (PowerBizBO.DLL) is the primary interface through which both the Optimizer and the PowerBiz client application access system data and business logic. The PowerBiz functionality is supported through the following interfaces:

Forecast interface—provides methods for saving and retrieving data from the Load Forecaster.

Load Monitor Interface—provides a means of viewing client meter data and allows for data validation and substitution.

BPA Load Interface—provides methods for saving BPA meter data.

Optimizer Interface—provides methods related to Optimizer data retrieval and update.

SLICE Data Interface—provides methods for saving and retrieving BPA SLICE data.

The PowerBiz Data Access DLL, as seen in FIG. 2, will be used from the Business Objects DLL to save and retrieve SQL Server data.

Figure 3A:
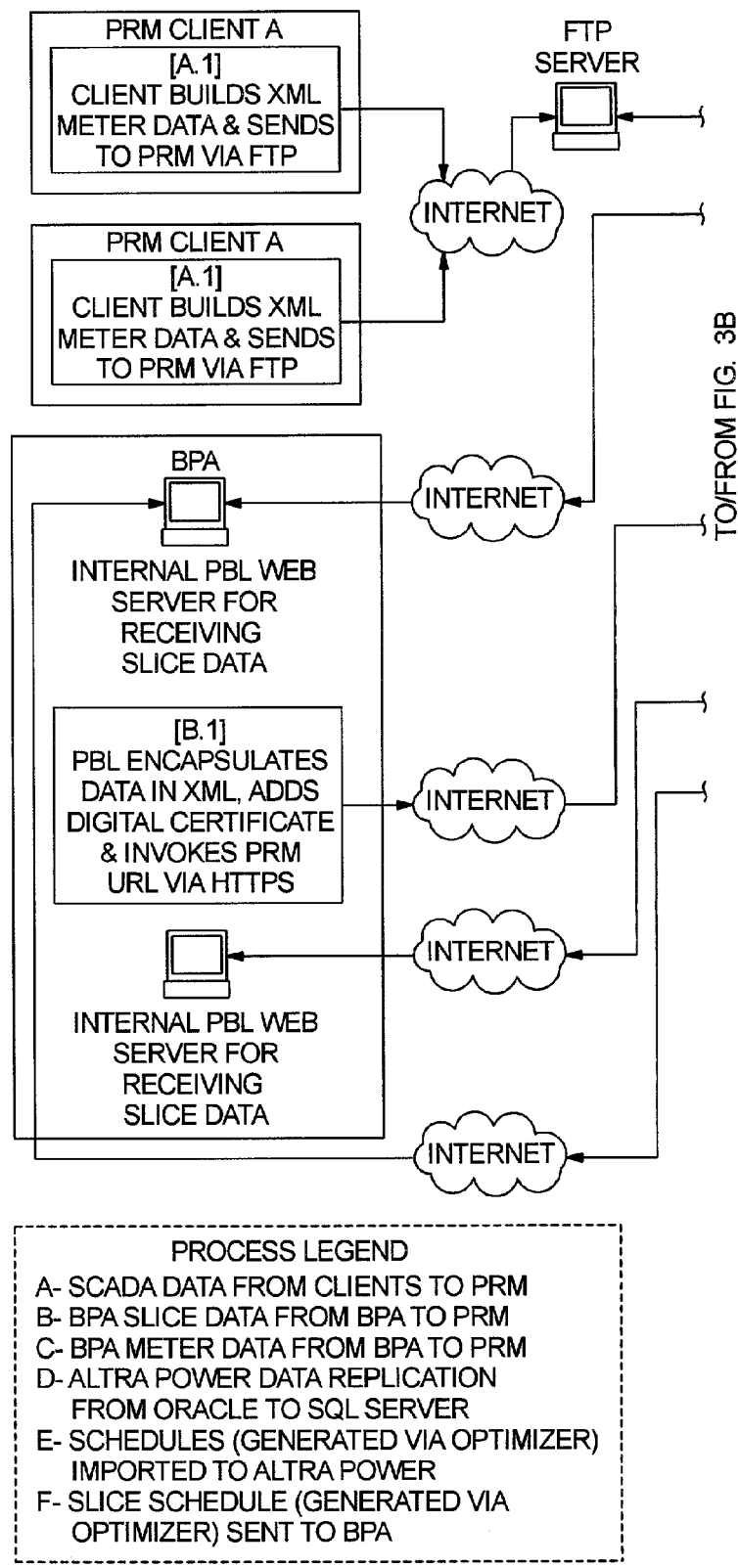
Figure 3B:
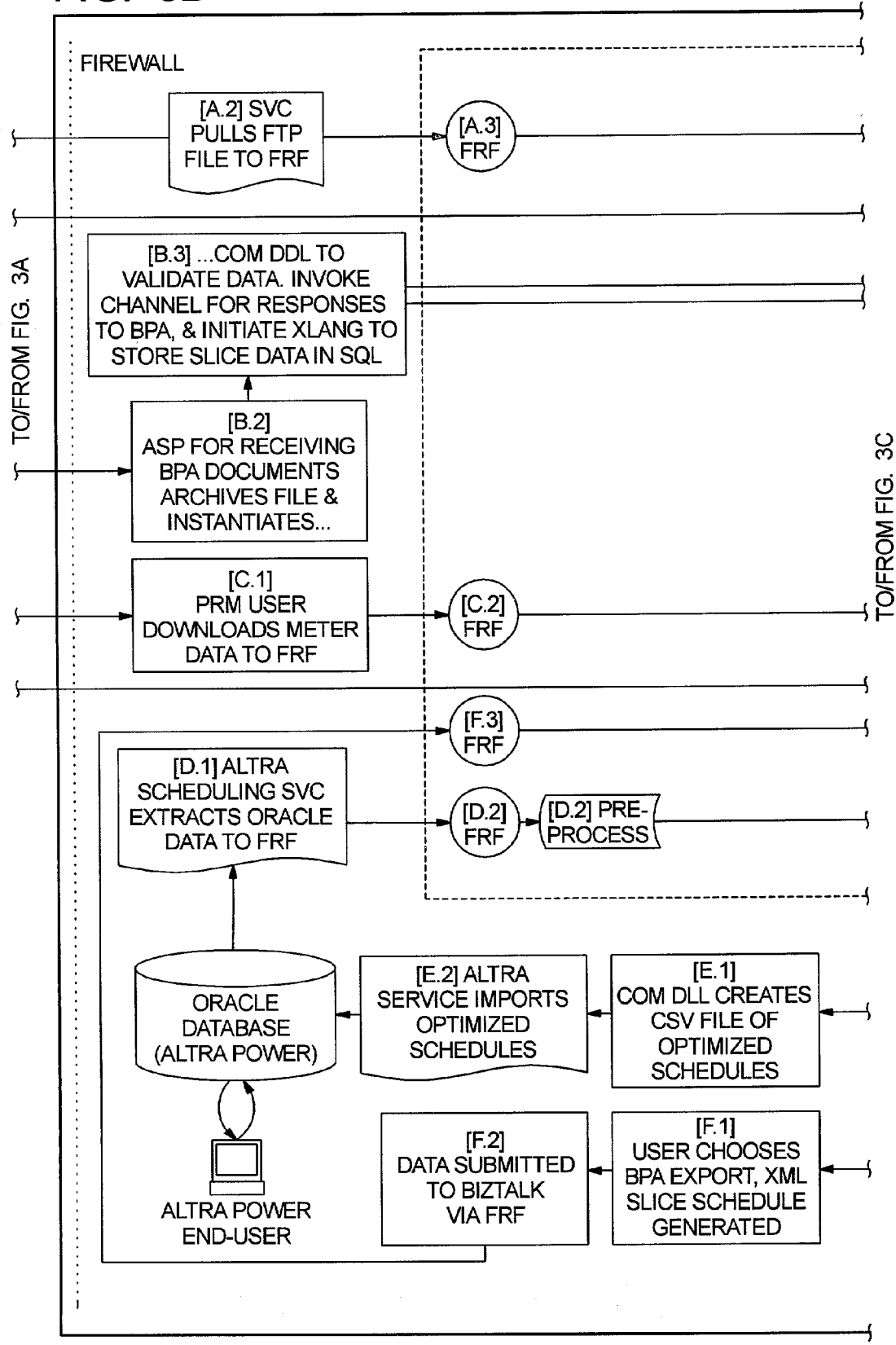
Figure 3C:
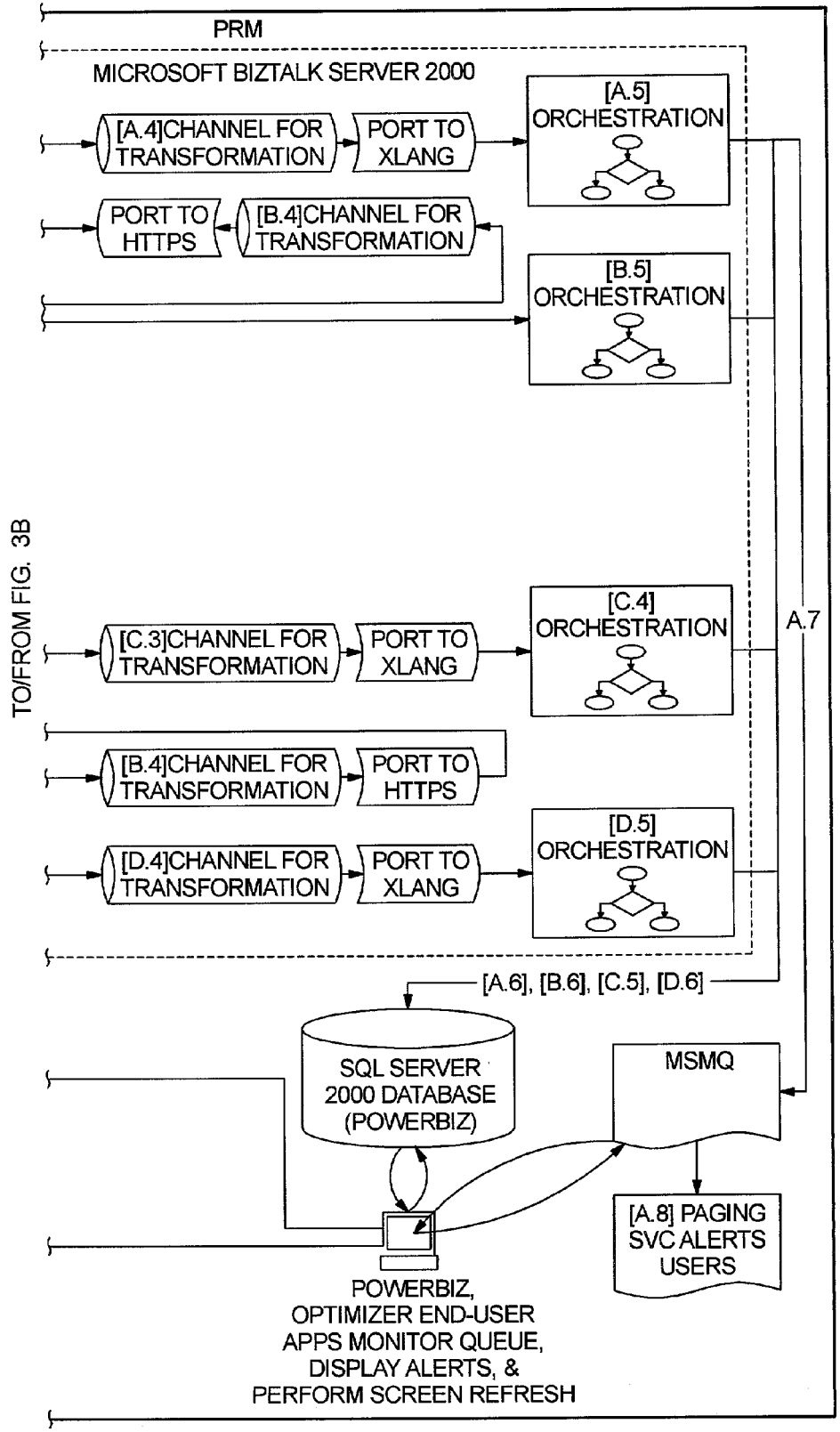

The diagram as seen in FIGS. 3A, 3B, and 3C shows an overall view of the PowerBiz application architecture depicting the flow of data.

OPTIMIZER COMPONENTS

The PowerBiz Optimizer architecture is a flexible, robust structure that utilizes a SQL Server database and a series of swappable optimization components that drive the optimization logic. The modifiable structure allows for optimization components to be customized to the load and resource constraints for different seasons of the year. As the seasons change, the components are changed. In addition, an extensible mechanism for data retrieval from SQL Server ensures plug-and-play support for the swappable optimization components. This allows all data to be stored in one SQL database.

The Optimizer is based on a composite of Excel worksheets and Visual Basic code modules. It is launched from within the PowerBiz application in order to set the Client context when optimizing a Real-Time or Day-Ahead Schedule. The Optimizer may also be loaded independent of PowerBiz. In this scenario, the user provides the Client context to initialize the Optimizer properly.

Optimizer will contain multiple sheets that will be hidden or shown depending on their use, defined as follows:
Optimizer User Interface Sheets (visible)
Real-Time Optimization Mode
Day-Ahead Optimization Mode
Optimized Schedule
Data Reference/Storage (hidden)
System Resource
System Record
System Forecast
Slice Schedule Output (TBD)
Application Name Reference
Reference identifiers (to eliminate cell reference hard coding)

As a result of the component architecture and extensible data retrieval mechanism, the Optimizer can operated independent of the database. The diagrams as seen in FIGS. 4 and 5 depict how the Optimizer can operate in both a connected, FIG. 4, and disconnected, FIG. 5, mode.

Figure 4:
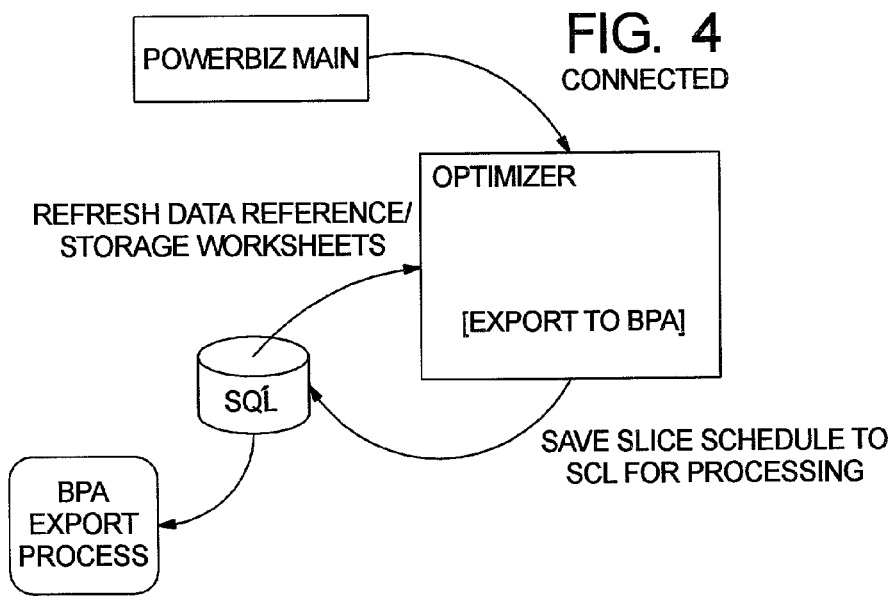
Figure 5:
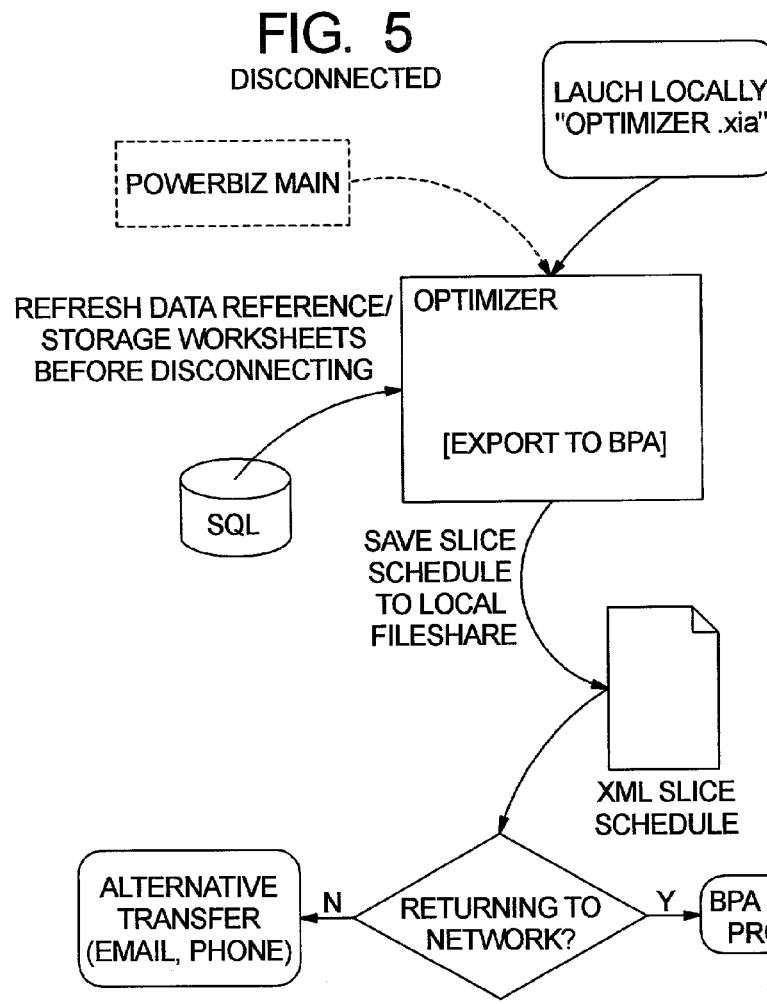

In Connected mode, FIG. 4, users will receive real-time notices that BPA data has been updated allowing users to refresh their Storage/Reference worksheets since the Optimizer will be able to detect if recently arrived BPA feeds would impact the existing Real-Time scheduling period (hour-ending). This will ensure that Real-Time optimization uses the most current BPA data.

Therefore I claim:

1. A method for optimizing utilization of electric power for a plurality of electric power users, said electric power provided from electric power providers such as electric power generating facilities including hydroelectric facilities, nuclear power plants, wind energy generation facilities, fossil fuel facilities, and other large-scale power producing facilities, and from other electric power users who have stored in one form or another surplus electrical power, said method comprising:
  a. obtaining actionable data comprising at least all of the following:
    i. electrical load requirement data from a plurality of electric power users;
    ii. electric power generation data from said electric power providers;
    iii. weather data;
    iv. targeted source water volume power data from one or more resources;
  b. importing the actionable data into an electrical power optimization database;
  c. executing a power optimization application resident in the optimization database to access the obtained data in the power optimization database;
  d. preparing a forecast of the electrical load requirements for the various users utilizing the weather satellite data and electrical load requirement data;
  e. correlating the forecasted electrical load requirements for the various electric power users with the available electrical power data from the various electrical power providers;
  f. executing an optimization process in the optimization application to optimize the electrical power use of the various electric power users by:

i. utilizing the correlated forecasted electrical load requirement data and available electric power data to determine a day-ahead electrical power utilization position;
ii. allocating electrical power into either a peak load use range or a low load use range;
iii. using the actionable data to determine a maximum electrical power use violation level and a minimum electrical power use violation level;
iv. allocating a certain amount of electrical power to be used for real-time open market use;
v. correlating the used electrical power with the forecasted electrical load requirements to adjust for electrical power storage flexibility;
g. producing a schedule based on the optimization of electrical power which maximizes and/or minimizes the usage of the power for various users;
h. communicating the schedule back to the electrical power providers for scheduling of electrical power use for the various electrical power users.

2. The method according to claim 1 wherein an electrical power provider further comprises a regional power authority which allocates the distribution of power to the various public and private power users.

3. The method according to claim 1 wherein the energy products include an energy entitlement system or contract where a participant or contractor of electrical power has an entitlement to a certain percentage of an electrical power provider's output.

4. The method according to claim 1 wherein preparing the forecast of electrical load requirement data further comprises:
a. importing from the optimization database into the optimization application forecasted and historical weather satellite data;
b. selecting from a list of scheduled days in the optimization application a candidate electrical power use day to be forecasted;
c. comparing in the optimization application the candidate electrical power use day's expected weather forecast with at least one other historical weather data day having similar weather characteristics and/or seasonal characteristics;
d. providing the historical electrical load requirement data for at least one of said historical weather data days;
e. utilizing in the optimization application the historical electrical load requirement for at least one of said historical weather data days to model the candidate electrical power day's electrical load requirement data.

5. A method for optimizing utilization of electric power for a plurality of electric power users, said electric power provided from electric power providers such as electric power generating facilities including hydroelectric facilities, nuclear power plants, wind energy generation facilities, fossil fuel facilities, other large-scale power producing facilities, and from other electric power users who have stored in one form or another surplus electrical power, said method comprising:
a. obtaining actionable data comprising at least all of the following:
i. electrical load requirement data from a plurality of electric power users;
ii. electric power generation data from said electric power providers;
iii. weather forecast data and weather history data;
iv. targeted source water volume power data from one or more resources;
b. importing the actionable data into an electrical power optimization database;
c. executing a power optimization application resident in the optimization database to access the obtained data in the power optimization database;
d. preparing a forecast of the electrical load requirements for the various users utilizing the weather satellite data and electrical load requirement data and further comprising:
i. importing form the optimization database into the optimization application forecasted and historical weather satellite data;
ii. selecting from a list of scheduled days in the optimization application a candidate electrical power use day to be forecasted;
iii. comparing in the optimization application the candidate electrical power use day's expected weather forecast with at least one other historical weather data day having similar weather characteristics and/or seasonal characteristics;
iv. providing the historical electrical load requirement data for at least one of said historical weather data days;
v. utilizing in the optimization application the historical electrical load requirement for at least one of said historical weather data days to model the candidate electrical power day's electrical load requirement data.
e. correlating the forecasted electrical load requirements for the various electric power users with the available electrical power data from the various electrical power providers;
f. executing an optimization process in the optimization application to optimize the electrical power use of the various electric power users by:
i. utilizing the correlated forecasted electrical load requirement data and available electric power data to determine a day-ahead electrical power utilization position;
ii. allocating electrical power into either a peak load use range or a low load use range;
iii. using the actionable data to determine a maximum electrical power use violation level and a minimum electrical power use violation level;
iv. allocating a certain amount of electrical power to be used for real-time open market use;
v. correlating the used electrical power with the forecasted electrical load requirements to adjust for electrical power storage flexibility;
g. producing a schedule based on the optimization of electrical power which maximizes and/or minimizes the usage of the power for various users;
h. communicating the schedule back to the electrical power providers for scheduling of electrical power use for the various electrical power users.

* * * * *